3,043,702
OPTICAL GLASS
Heinz Brömer, Hermannstein, and Norbert Meinert, Wetzlar (Lahn), Germany, assignors to Ernst Leitz Gesellschaft mit beschränkter Haftung, Wetzlar, Germany
No Drawing. Filed Sept. 17, 1959, Ser. No. 840,529
Claims priority, application Germany Sept. 20, 1958
10 Claims. (Cl. 106—47)

The present invention relates to optical glass and more particularly to optical glass having a high refractory power and a medium dispersion and having an abnormal partial dispersion.

It is known in the art to produce optical glass containing alkali oxides or compounds of alkali salts in the form of borates or phosphates. However, it has been found that such an optical glass is chemically not sufficiently stable.

It is, therefore, the object of the present invention to provide an optical glass having a high refractory power, a medium dispersion, and an abnormal partial dispersion, and which has a satisfactory chemical stability.

This object is achieved by the present invention, according to which the optical glass is obtained by melting a mixture of chemical substances comprising a bulk portion of lead-borate or lead-phosphate, and comprising, in addition, substantial amounts of boric acid, tantalum oxide and aluminum oxide, and containing smaller amounts of zinc oxide and/or cadmium oxide, zirconium oxide, alkaline earth oxides and eventually rare earth oxides.

It is of advantage to add to this mixture small amounts of stabilizing or decolorizing substances, as for instance, silicic acid, arsenic oxide or the like.

As to the quantities of the afore-mentioned substances it has been found to be of particular advantage to use a mixture wherein the amount of lead borate or lead phosphate is in the order of from 45 and 70% by weight, the amount of boric acid is between 10% and 30% by weight; the amount of tantalum oxide is between 2% and 15% by weight; the amount of aluminum oxide is between 8% and 15% by weight; the amount of zinc- and/or cadmium oxide is below 15% by weight; the amount of zirconium oxide is below 5% by weight; the amount of alkaline earth oxide is below 15% by weight; and the amount of the rare earth oxides, as for example lanthanum oxide, is below 7% by weight.

It has been found to be preferable to add to the mixture as an alkaline earth oxide component alkaline earth tantalate.

Instead of tantalum oxide it is also possible to use niobium oxide or a mixture of the both.

According to the invention, a mixture is prepared containing the afore-mentioned substances in the above-indicated relative quantities.

This mixture is then processed in manner generally known in the art of optical glass making. The mixtures are melted in a vessel, preferably composed of platinum, at a temperature in the order from 1200° to 1250° centigrade. The melt is then refined by constant stirring at a temperature of approximately 1250° centigrade, until no further bubbles of air and containing eventual impurities rise to the surface of the melt. The duration of the refining process depends, of course, on the quantity of the melt; as a general rule it will be necessary to refine for about one hour where the quantity of the melt is one kilogram. The refined melt is then cooled down to a temperature of approximately 800° centigrade; this temperature drop takes about one hour with a kilogram of melt. Thereupon the melt is ready for casting.

As a result, an optical glass is obtained having a high refractory power, a medium dispersion, with an abnormal partial dispersion, and an excellent chemical stability.

The invention will be further more specifically explained by the following examples and tables which are, of course, not to be considered as limiting the scope of the present invention, and wherein $n$ represents the index of the refractory power of the optical glass composed and obtained according to the present invention. $\nu_e$ represents Abbé value which is defined by the quotient $$\frac{n_e - 1}{n_{F'} - n_{C'}}$$

$\vartheta$ designates the relative partial dispersion defined by the quotient $$\frac{n_g - n_{F'}}{n_{F'} - n_{C'}}$$

$\Delta \nu_e$ designates the difference of the $\nu$ value of the respective glass in the $\vartheta \nu$ diagram from the curve on which the glasses, having a normal partial dispersion, are located. It is known in the art that most of the optical glasses are located in alignment in the $\vartheta \nu$ diagram thereby showing $\nu$ values which are greater than 35. Glasses having a $\nu$ value smaller than 35 differ from the alignment in as much as they have higher $\vartheta$ values than would belong to their $\nu$ values, with regard to the aforementioned alignment.

$\Delta \nu$ is more specifically described in the German Patent No. 919,366. However, it should be noted that the diagram illustrated in this patent is given for the refraction index $n_D$, for the Abbé value $\nu_D$ and for $\nu$ which belongs to these two values.

*Example I*

1 kilogram of a mixture is prepared containing, by weight, 55.5% of lead phosphate, 21.2% of boron oxide, 10.1% of aluminum oxide and 13.2% of zinc oxide.

The mixture is melted in a platinum vessel at a temperature of about 1250° C. It is then refined under constant stirring at a temperature of 1250° C. for about one hour. The refined mixture is then cooled down to a temperature of 800° C. during a period of about one hour, whereupon it is ready for casting.

As a result, an optical glass is obtained having a high refractory power, a medium dispersion with an abnormal partial dispersion and an excellent chemical stability, with the specific properties as indicated in the last four lines of column 1 in Table I.

*Example II*

Example I is repeated with the exception that a mixture is prepared containing, by weight, 56.5% of lead phosphate, 17.2% of boron oxide, 10.1% of aluminum oxide, 2.0% of tantalum oxide and 14.2% of zinc oxide. The specific properties of the optical glass thus obtained are indicated in the last four lines of column 2 of Table I.

*Example III*

Example I is repeated with the exception that a mixture is prepared containing, by weight, 55.6% of lead phosphate, 16.8% of boron oxide, 9.9% of aluminum oxide, 2.0% of tantalum oxide and 15.7% of zinc oxide. The specific properties of the optical glass thus obtained are indicated in the last four lines of column 3 of Table I.

*Example IV*

Example I is repeated with the exception that a mixture is prepared containing, by weight, 49.9% of lead phosphate, 24.5% of boron oxide, 12.0% of aluminum oxide and 13.6% of calcium tantalate. The specific properties of the optical glass thus obtained are indicated in the last four lines of column 4 of Table I.

Example V

Example I is repeated with the exception that a mixture is prepared containing, by weight, 46.5% of lead phosphate, 20.2% of boron oxide, 9.8% of aluminum oxide, 7.9% of calcium tantalate and 15.4% of zinc oxide. The specific properties of the optical glass thus obtained are indicated in the last four lines of column 5 of Table I.

Example VI

Example I is repeated with the exception that a mixture is prepared containing, by weight, 48.1% of lead phosphate, 20.8% of boron oxide, 10.0% of aluminum oxide, 8.1% of calcium tantalate and 13.0% of zinc oxide. The specific properties of the optical glass thus obtained are indicated in the last four lines of column 6 of Table I.

Example VII

Example I is repeated with the exception that a mixture is prepared containing, by weight, 46.6% of lead phosphate, 19.8% of boron oxide, 13.1% of aluminum oxide, 7.8% of calcium tantalate and 12.7% of zinc oxide. The specific properties of the optical glass thus obtained are indicated in the last four lines of column 7 of Table I.

Example VIII

Example I is repeated with the exception that a mixture is prepared containing, by weight, 48.2% of lead phosphate, 20.9% of boron oxide, 10.0% of aluminum oxide, 8.2% of calcium tantalate and 12.7% of zinc oxide. The specific properties of the optical glass thus obtained are indicated in the last four lines of column 8 in Table II.

Example IX

Example I is repeated with the exception that a mixture is prepared containing, by weight, 65.6% of lead borate, 15.6% of boron oxide, 11.4% of aluminum oxide and 7.4% of calcium tantalate. The specific properties of the optical glass thus obtained are indicated in the last four lines of column 9 in Table II.

Example X

Example I is repeated with the exception that a mixture is prepared containing, by weight, 63.7% of lead borate, 15.1% of boron oxide, 11.1% of aluminum oxide, 7.2% of calcium tantalate and 2.9% of zinc oxide. The specific properties of the optical glass thus obtained are indicated in the last four lines of column 10 in Table II.

Example XI

Example I is repeated with the exception that a mixture is prepared containing, by weight, 57.7% of lead borate, 16.6% of boron oxide, 12.1% of aluminum oxide, 7.9% of calcium tantalate and 5.7% of lanthanum oxide. The specific properties of the optical glass thus obtained are indicated in the last four lines of column 11 at Table II.

Example XII

Example I is repeated with the exception that a mixture is prepared containing, by weight, 58.4% of lead borate, 16.5% of boron oxide, 12.1% of aluminum oxide, 7.9% of calcium tantalate and 5.1% of lanthanum oxide. The specific properties of the optical glass thus obtained are indicated in the last four lines of column 12 at Table II.

Example XIII

Example I is repeated with the exception that a mixture is prepared containing, by weight, 57.0% of lead borate, 16.3% of boron oxide, 11.9% of aluminum oxide, 7.8% of calcium tantalate, 5.1% of lanthanum oxide and 1.9% of zirconium oxide. The specific properties of the optical glass thus obtained are indicated in the last four lines of column 13 of Table II.

Example XIV

Example I is repeated with the exception that a mixture is prepared containing, by weight, 61.4% of lead borate, 14.6% of boron oxide, 10.7% of aluminum oxide, 7.0% of calcium tantalate, 4.6% of lanthanum oxide, 1.7% of zirconium oxide. The specific properties of the optical glass thus obtained are indicated in the last four lines of column 14 of Table II.

TABLE I

| Substance | Percentage in weight | | | | | | |
|---|---|---|---|---|---|---|---|
| | 1 | 2 | 3 | 4 | 5 | 6 | 7 |
| $Pb_3(PO_4)_2$ | 55.5 | 56.5 | 55.6 | 49.9 | 46.5 | 48.1 | 46.6 |
| $Pb(BO_2)_2$ | | | | | | | |
| $B_2O_3$ | 21.2 | 17.2 | 16.8 | 24.5 | 20.2 | 20.8 | 19.8 |
| $Al_2O_3$ | 10.1 | 10.1 | 9.9 | 12.0 | 9.8 | 10.0 | 13.1 |
| $CaTa_2O_6$ | | | | 13.6 | 7.9 | 8.1 | 7.8 |
| $Ta_2O_5$ | | 2.0 | 2.0 | | | | |
| $ZnO$ | 13.2 | 14.2 | 15.7 | | 15.4 | 13.0 | 12.7 |
| $La_2O_3$ | | | | | | | |
| $ZrO_2$ | | | | | | | |
| $n_e$ | 1.697 | 1.723 | 1.728 | 1.696 | 1.736 | 1.725 | 1.724 |
| $\nu_e$ | 37.8 | 35.9 | 35.6 | 36.0 | 35.6 | 36.1 | 36.0 |
| $\vartheta$ | 508 | 513 | 512 | 511 | 512 | 512 | 513 |
| $\Delta\nu_e$ | -4.1 | -2.9 | -3.8 | -4.0 | -3.8 | -3.3 | -3.0 |

TABLE II

| Substance | Percentage in weight | | | | | | |
|---|---|---|---|---|---|---|---|
| | 8 | 9 | 10 | 11 | 12 | 13 | 14 |
| $Pb_3(PO_4)_2$ | 48.2 | | | | | | |
| $Pb(BO_2)_2$ | | 65.6 | 63.7 | 57.7 | 58.4 | 57.0 | 61.4 |
| $B_2O_3$ | 20.9 | 15.6 | 15.1 | 16.6 | 16.5 | 16.3 | 14.6 |
| $Al_2O_3$ | 10.0 | 11.4 | 11.1 | 12.1 | 12.1 | 11.9 | 10.7 |
| $CaTa_2O_6$ | 8.2 | 7.4 | 7.2 | 7.9 | 7.9 | 7.8 | 7.0 |
| $Ta_2O_5$ | | | | | | | |
| $ZnO$ | 12.7 | | 2.9 | | | | |
| $La_2O_3$ | | | | 5.7 | 5.1 | 5.1 | 4.6 |
| $ZrO_2$ | | | | | | 1.9 | 1.7 |
| $n_e$ | 1.729 | 1.728 | 1.736 | 1.731 | 1.725 | 1.735 | 1.747 |
| $\nu_e$ | 35.5 | 34.2 | 33.9 | 35.3 | 35.4 | 34.9 | 34.2 |
| $\vartheta$ | 511 | 513 | 515 | 515 | 514 | 511 | 515 |
| $\Delta\nu_e$ | -4.5 | -5.0 | -4.0 | -2.0 | -3.0 | -5.1 | -4.4 |

It will be understood that this invention is susceptible to further modification and, accorddingly, it is desired to comprehend such modifications within this invention as may fall within the scope of the appended claims.

What we claim is:

1. Optical glass having a high refractory power, medium dispersion with an abnormal partial dispersion and excellent chemical stability consisting essentially of the heat reaction product of, in percent by weight of the glass, 45–70% of a lead salt of the group consisting of lead borate and lead phosphate; 10–30% of boric acid; 8–15% of aluminum oxide; about 7.4–23.3% of a member of the group consisting of 0–15% tantalum oxide, 0–15% zinc oxide, 0–15% cadmium oxide, 0–5% zirconium oxide, 0–15% of an alkaline earth oxide, 0–7% of a rare earth oxide, and mixtures thereof.

2. The glass of claim 1, wherein the lead salt is lead borate.

3. The glass of claim 1, wherein the lead salt is lead phosphate.

4. Optical glass having a high refractory power, medium dispersion with an abnormal partial dispersion and excellent chemical stability consisting essentially of the heat reaction product of, in percent by weight of the glass, 45–70% of a lead salt of the group consisting of lead borate and lead phosphate; 10–30% of boric acid; 8–15% of aluminum oxide; and 7–15% of zinc oxide.

5. Optical glass having a high refractory power, medium dispersion with an abnormal partial dispersion and excellent chemical stability consisting essentially of the heat reaction product of, in percent by weight of the glass, 45–70% of a lead salt of the group consisting of lead borate and lead phosphate; 10–30% of boric acid;

8-15% of aluminum oxide; and 7-15% alkaline earth tantalate.

6. The glass of claim 5, wherein the alkaline earth tantalate is calcium tantalate.

7. Optical glass having a high refractory power, medium dispersion with an abnormal partial dispersion and excellent chemical stability consisting essentially of the heat reaction product of, in percent by weight of the glass, 45-70% of a lead salt of the group consisting of lead borate and lead phosphate; 10-30% of boric acid; 8-15% of aluminum oxide; 7-15% of calcium tantalate and 15% zinc oxide.

8. Optical glass having a high refractory power, medium dispersion with an abnormal partial dispersion and excellent chemical stability consisting essentially of the heat reaction product of, in percent by weight of the glass, 45-70% of a lead salt of the group consisting of lead borate and lead phosphate; 10-30% of boric acid; 8-15% of aluminum oxide; 7-15% of calcium tantalate; 0-15% zinc oxide; and 0-7% of a rare earth oxide.

9. Optical glass having a high refractory power, medium dispersion with an abnormal partial dispersion and excellent chemical stability consisting essentially of the heat reaction product of, in percent by weight of the glass, 45-70% of a lead salt of the group consisting of lead borate and lead phosphate; 10-30% of boric acid; 8-15% of aluminum oxide; 7-15% of calcium tantalate; 0-15% zinc oxide; 0-7% of a rare earth oxide; and 0-5% of zirconium oxide.

10. The optical glass of claim 1, wherein tantalum oxide is present in said glass in a concentration of 2-15%.

References Cited in the file of this patent

UNITED STATES PATENTS

| | | |
|---|---|---|
| 2,441,853 | Stanworth | May 18, 1948 |
| 2,511,228 | Sun et al. | June 13, 1950 |
| 2,684,304 | Weissenberg et al. | July 20, 1954 |
| 2,866,712 | Weissenberg et al. | Dec. 30, 1958 |

FOREIGN PATENTS

| | | |
|---|---|---|
| L21,129 | Germany | Mar. 15, 1956 |